Patented May 4, 1937

2,079,030

UNITED STATES PATENT OFFICE 2,079,030

POWDERED FOOD PRODUCT AND METHOD OF PREPARATION

Robert T. Northcutt, Cranford, N. J.

No Drawing. Application May 22, 1934,
Serial No. 726,955

4 Claims. (Cl. 99—125)

This invention relates to food products and to methods for the production thereof.

An object of the invention is to provide a food product containing a high proportion of oily material in a protected condition.

Another object is the provision of a dried coconut product of an improved character.

A further object is the provision of a coconut powder which is well adapted for use in confectionery, bakery products, kitchen products, drinks, etc.

A still further object is the provision of a coconut powder having good keeping qualities.

Another object is the provision of an improved procedure for the production of a food product containing a high proportion of oily material in a protected condition.

Another object is the provision of an improved procedure for drying coconut.

Still another object is the provision of an improved method for the production of coconut powder.

Other objects of the invention will in part be obvious and will in part appear hereinafter.

The invention accordingly comprises the several steps and the relation and order of one or more of such steps with respect to each of the others, and the product possessing the features, properties, and the relation of constituents, which are exemplified in the following detailed disclosure, and the scope of the application of which will be indicated in the claims.

The only so-called "coconut powder" which is now found on the market is a coarse granular product formed by sifting the smaller pieces produced during the usual coconut shredding operation and known in the trade as "macaroon". This product, even when only the finest particles are sifted from shredded coconut, is of a size which can only be considered a powder in the same sense that sand is a powder. The product is substantially lacking in absorbent properties and does not satisfy the needs of the confectionery trade for a fluffy, absorbent material. Indeed, the use of coconut in confectionery, puddings, cookies, pie-fillers, and as an ingredient of soda fountain drinks has been greatly neglected, due to the absence of any fluffy powder which will satisfy the needs for such articles. As is well known, "macaroon", as well as shredded coconut does not blend with any article with which it is incorporated, so that a person eating the coconut-containing candy, cake, pudding, or the like, obtains, along with the desirable coconut flavor, an undesirable sensation of encountering solid particles, which often is so annoying that he abstains from eating coconut products entirely. Moreover, the use of shredded coconut or macaroon is uneconomical, since the coconut is concentrated in relatively large masses, and the desired flavor cannot be spread thru the article without the addition of a relatively large proportion of coconut to the candy, pudding, pie or other article being made. Also, as will be apparent, neither shredded coconut nor macaroon will form a suspension in water. Such materials, therefore, are not adapted for use as an ingredient of such drinks as hot chocolate, milk shakes, and the like; and coconut extracts fail to carry the full flavor or the full nutritive value and beneficial effect that can be obtained when the fibre is included.

The production of a fluffy coconut powder is, however, beset with difficulties because of the high content of oily material in coconut and the tendency of this oily material to become rancid in a relatively short time when it is released from its natural condition, as by grinding. In the nut itself, and to a considerable extent in shredded coconut, the oily materials are protected by being in an emulsified state, or by the protective action of some agent naturally present in the coconut, and probably by both of these factors. However, ordinary grinding of the coconut breaks up the emulsion and releases a large proportion of the oily material, and this gathers in independent globs which will readily rancidify.

Regardless of whether it is the emulsifying agents, an anti-oxidizing agent, or some other type of protective agent present in the coconut, which acts to protect the oils of the coconut from rancidification, it has been found that non-oily ingredients of coconut may be utilized to protect oily materials when the latter are thoroughly distributed throughout the mass. By a proper grinding and agitation of the entire coconut ingredients the protective agent or agents, whatever their nature, may be so thoroughly distributed with respect to the oily material that the agent or agents will protect the oily material when the product is dried substantially as well as they protected them in the original nut. Likewise, non-oily coconut materials may be utilized to protect oily material previously separated from coconut, and also to protect oily materials obtained from other sources. For instance, coconut press-cake, which is the residue material after the expression of oils from the whole coconut, may be added to various oily materials, such as butter, lard, cottonseed oil, etc., and the mixture treated in accordance with the invention to provide a product which is well protected against rancidification, even though the proportion of oily material is considerably greater than the proportion of the press-cake. Furthermore, the fibre and/or other non-essential ingredients may be removed from the coconut, and the residue added to an oily material and treated in accordance with the invention to protect the oily material from rancidification. As will be apparent, the invention has many uses in the protection of oily materials, both in cases where a coconut flavor is to be added to bakery products or confections together with oil, and in cases where it is desirable primarily to protect the oily materials from rancidification but wherein certain nut ingredients are not objectionable.

The invention accordingly contemplates not only the provision of a nut powder, especially a coconut powder, having highly desirable characteristics, and of improved methods for the production of powdered coconut, but also contemplates the utilization of the protective agents in the natural nut for the protection of oily materials other than those included in the nut, and the production of oily materials in powder form and having good keeping qualities.

It is to be understood that the term "oily material" as used herein embraces oils, fats, and analogous substances.

In accordance with the invention there is provided a light, fluffy powder of such nature that it is readily miscible with water. The powder is non-greasy in appearance and the oil content is so distributed in each particle as to be substantially non-rancidifiable during ordinary conditions of use. The powder will absorb several times its weight in water, and will retain this water to a remarkable degree. For instance, coconut powder produced in accordance with the invention has been wet with 2½ to 4 times its weight in water, and masses of this wetted powder one to four inches high have been placed on a glass plate without losing any appreciable amount of the absorbed water. Inspection of a mass of this wetted powder under a ten-power glass revealed no particles of free oily material. Even when the mass was heated to a temperature approaching the boiling point, no such particles appeared. Inspection of masses of the powder itself has shown no free oil, even, in some instances, when examined under ten-power and forty-power glasses. Masses of powder embodying the invention have had a large quantity of cool water added to them without any visible particles of free oil rising to the surface of the water.

There is provided a new product wherein the various ingredients of the coconut are thoroughly distributed throughout the mass. In this condition each particle of oil is protected against rancidification, either by being in an emulsified form, or by being in contact with some anti-oxidizing or other anti-rancidifying material contained in the coconut, or by both. As will be seen, this is an important factor, as is also the fact that the product is in a light, fluffy, and highly absorbent form in which it will readily mix with liquid drinks, and will provide a highly desirable ingredient of confectionery and table foods.

In general, the invention contemplates the provision of a powder which is of a light, fluffy, absorbent nature, and wherein the ingredients are so thoroughly distributed that no readily visible particles of free oil are present.

In carrying out the invention, coconut is well ground and crushed and is also agitated so as to assure a thorough distribution of the ingredients. The grinding and agitating operations may be conducted as distinct steps, but are preferably carried out as a single procedure. The whole nut, either with or without the milk, is desirably utilized. Ordinarily water is added to facilitate the agitation and distribution, and to facilitate handling. Desirably, an amount of water about equal to one or two times the weight of the coconut is added if fresh coconut is employed. If copra, "macaroon" or other dried coconut product is employed, an additional amount of water sufficient to compensate for the amount extracted in the production of the copra is desirably added. After the grinding and agitating steps are completed, the product is a pulpy mass which will retain about 2½ to about 4 times its weight in water and which will show no free oil when examined by the naked eye. A well agitated pulp will show no free oily particles even after standing for about an hour or centrifuging for about a minute. Preferably, the agitation should be sufficient to provide a distribution such that no free oily particles can be seen through a ten-power glass. Desirably, the grinding should be sufficient so that the pulpy mass will pass through or can be pushed through a forty-mesh screen; and in some instances it is desirable to grind the material to a fineness such that it will pass through a sixty-mesh screen. If the material is well crushed, however, it may in certain instances be sufficiently coarse so that it will not readily pass through a sixteen-mesh screen. The pulp is thereupon dried in any suitable manner to provide a light fluffy mass wherein the ingredients remain well distributed.

The grinding and crushing may be performed by any suitable means, but is desirably performed by a hammer-mill, plate mill, ball mill, etc., wherein the agitating step will be performed simultaneously with the grinding step. For instance, a pulpy mass of the character described may be formed by cutting the coconut into sizes having a maximum diameter of not over one and one-half inches and introducing the same into a hammer-mill and subjecting them to a violent grinding and agitating operation.

It is to be noted that if the grinding is too fine, for instance so fine that the particles of the ground mass approach colloidal size, the resulting powder will not be fluffy, but will be heavy and compact and will not have the advantages of a fluffy powder.

By way of example of one manner of producing a dried product in accordance with the invention, the following is given: Freshly peeled coconut may be broken up into pieces about an inch or less in diameter and fed into a "Robinson" hammer-mill, 24 inches in diameter, equipped with a screen having perforations $\frac{1}{16}$" in diameter and traveling at 1750 R. P. M. Such mills, of the swing hammer type, are manufactured by Robinson Manufacturing Company of Muncie, Pennsylvania. Together with the coconut there is admitted to the mill an amount of water about one or two times the weight of the nut meat fed.

The nut meat is crushed and forced through the screen, being agitated during this operation and taking up water as it is crushed and agitated. A relatively coarse pulp of a flaky nature is obtained, together with some fines. If water is added in an amount up to 1½ times the total weight of fresh meat, i. e., up to four times the solid weight of the coconut, the product from the mill will retain all of the water added.

The resulting product may then be fed into a spray-drying apparatus, such, for instance, as ordinary milk drier, or other suitable drying tower. The pulpy product is fed into a rotating spray wheel and is dried at temperatures somewhat higher than ordinary milk drying temperatures. Satisfactory temperatures are from 325 to 350° F. at the tower top, dropping to about 200° F. The heat of the air may assist in breaking up the larger particles. Five hundred pounds per hour of a slurry containing 20% solids by weight may be readily dried. Such fines as are present ordinarily increase the efficiency of the spray-drying operation.

Alternatively, shelf, tunnel, apron or tray drying may be utilized, the pulpy material being introduced into the drying means and subjected to a temperature of around 160° to 180° F. Because of the presence of fines, the resulting dried product will be somewhat more compact when tray drying is resorted to than if spray dried. For many purposes, therefore, it is desirable to eliminate the greater proportion of the fines, together with some of the more liquid constituents, before tray drying. This separation may desirably be performed by placing the wet material on a screen and shaking or agitating gently to cause some liquid to drain off. In cases where the ground material will retain about three or four times its solid weight in water, an additional part of water to make up to five times the solid weight of water present may desirably be added, this extra amount of water being added either originally or at a later stage in the operation as desired. A gentle pressure may be used to assist in pressing water out of the material. A screen of 16 to 20 mesh is suitable for the draining operation. When well drained, the material remaining on the screen will be coarse, flaky, non-greasy, and the mass will retain its shape and will hold the remaining water if piled in small mounds on a flat surface. This coarse material is placed in trays to a depths of 1 or 2 inches, and the trays placed in a compartment heated so that the material will reach a temperature of from 160° to 180° F. Temperatures above 180° F. are likely to cause the material to gain color. The material will dry in two or three hours, provided good air circulation is provided, and the drying may be hastened by the provision of a partial vacuum in the chamber containing the trays.

The finer material and materials dissolved in the separated liquid may be similarly dried, preferably being concentrated in an open kettle or in vacuo before final drying. The resultant product will be considerably denser than the product obtained from the coarse material, but will still have a water-absorbing powder far above ordinary coconut and will be non-greasy. The fine, dense powder will take up about two times its weight in cold water instantly, and the coarser powder will take up instantly four times its weight in cold water. The two products may be used together or independently, depending on the requirements for any particular use.

Coconut press-cake and the separated oily material of coconut together with a desired amount of water may be similarly treated.

Regardless of what type of drying operation is utilized there will be produced a powder which will be non-granular, highly water-absorbent, readily miscible with water, and adapted for efficient and economical use. Candy having the full coconut flavor of ordinary coconut candy has been produced by replacing with sugar half the amount of coconut ordinarily employed.

As will be apparent a powder such as contemplated by the invention may be provided by the treatment of other nuts (in which term is included various oil-bearing nut-like materials) and the invention in its broader aspects is not limited to coconuts.

As above indicated, ingredients obtained from the nut may be utilized to protect other oily materials against rancidification. For instance, 40 parts of coconut press-cake may be ground and agitated with 60 parts of butter, 400 parts of water preferably being included, and the resulting pulpy mass spray-dried or otherwise desiccated. As another example, coconut press-cake may be ground and agitated with an amount of cottonseed oil approximating the amount of oily material extracted from the coconut, water being added in a proportion of about two times the weight of the other ingredient and the resulting pulpy mass suitably dried. As a further example, non-oily materials from coconut may be admixed in suitable proportions with lard, vegetable fat, etc., and the product suitably desiccated. Non-oily ingredients of other nuts may also be utilized.

Since certain changes in carrying out the above process, and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent is:

1. A coconut product comprising comminuted coconut in the form of a light, fluffy powder, readily dispersible in water, non-greasy in appearance, having its oil content so distributed in each particle as to be substantially non-rancidifiable, and highly water-absorbent without liberation of free oil.

2. The method of preparing a light, fluffy, substantially non-rancidifiable coconut product, which comprises simultaneously grinding and crushing whole coconut meat in the presence of water in quantities such that the coconut meat will completely absorb the same until a pulpy mass is produced which mass is non-greasy in appearance, continuing the grinding and crushing until the pulpy mass may be pushed through a screen ranging from approximately sixty- to sixteen-mesh, pushing the pulp through the screen, and drying the resulting pulp to a light, fluffy powder which is substantially non-rancidifiable and which is readily dispersible in water.

3. The method of preparing a light, fluffy, substantially non-rancidifiable nut product, which comprises simultaneously grinding and crushing whole nut meat in the presence of water in quantities substantially in excess by weight of the weight of the nut meat but which will be completely absorbed by the nut meat and remain so absorbed without liberation of free oil, continuing the grinding and crushing until the pulpy mass may be pushed through a screen ranging from approximately sixty- to approximately sixteen-mesh, pushing the pulp through such a screen, and spray-drying the resulting pulp to form a light, fluffy powder which is substantially non-rancidifiable, which is readily dispersible in water, and which is non-greasy in appearance.

4. A coconut product comprising comminuted coconut in the form of a light, fluffy powder, readily dispersible in water, non-greasy in appearance, having its oil content so distributed in each particle as to be substantially non-rancidifiable, and which will absorb about 2 to about 4 times its weight in water without liberation of free oil.

ROBERT T. NORTHCUTT.